(12) United States Patent
Dehne

(10) Patent No.: US 7,781,119 B2
(45) Date of Patent: Aug. 24, 2010

(54) FLOW SHIFTING IN EACH INDIVIDUAL CELL OF A FUEL CELL STACK

(75) Inventor: Tomas Dehne, Montabaur (DE)

(73) Assignee: GM Global Technology Operations, Inc., Detroit, MI (US)

( * ) Notice: Subject to any disclaimer, the term of this patent is extended or adjusted under 35 U.S.C. 154(b) by 1328 days.

(21) Appl. No.: 11/112,147

(22) Filed: Apr. 22, 2005

(65) Prior Publication Data

US 2006/0240309 A1    Oct. 26, 2006

(51) Int. Cl.
*H01M 8/02* (2006.01)
*H01M 2/18* (2006.01)

(52) U.S. Cl. .................. 429/446; 429/457; 429/514; 429/443

(58) Field of Classification Search .................. None
See application file for complete search history.

(56) References Cited

U.S. PATENT DOCUMENTS

| | | | |
|---|---|---|---|
| 5,773,160 A | 6/1998 | Wilkinson et al. |
| 5,888,148 A | 3/1999 | Allen |
| 5,890,973 A | 4/1999 | Gamble |
| 5,908,357 A | 6/1999 | Hsieh |
| 5,921,872 A | 7/1999 | Kobayashi |
| 5,931,746 A | 8/1999 | Soong |
| 5,935,019 A | 8/1999 | Yamamoto |
| 5,938,541 A | 8/1999 | Allen et al. |
| 5,941,782 A | 8/1999 | Cook |
| 5,944,619 A | 8/1999 | Cameron |
| 5,954,596 A | 9/1999 | Noble et al. |
| 5,961,394 A | 10/1999 | Minabe |
| 5,967,905 A | 10/1999 | Nakahara et al. |
| 5,971,868 A | 10/1999 | Kosmatka |
| 5,993,329 A | 11/1999 | Shieh |
| 6,007,432 A | 12/1999 | Kosmatka |
| 6,027,416 A | 2/2000 | Schmidt et al. |
| 6,139,445 A | 10/2000 | Werner et al. |
| 6,143,169 A | 11/2000 | Lee |
| 6,152,833 A | 11/2000 | Werner et al. |
| 6,248,025 B1 | 6/2001 | Murphy |
| 6,319,150 B1 | 11/2001 | Werner et al. |
| 6,338,683 B1 | 1/2002 | Kosmatka |
| 6,354,962 B1 | 3/2002 | Galloway et al. |
| 6,368,234 B1 | 4/2002 | Galloway |
| 6,381,828 B1 | 5/2002 | Boyce |
| 6,390,933 B1 | 5/2002 | Galloway |
| 6,398,666 B1 | 6/2002 | Evans et al. |
| 6,435,982 B1 | 8/2002 | Galloway et al. |

(Continued)

FOREIGN PATENT DOCUMENTS

DE    197 46 301    4/1998

(Continued)

*Primary Examiner*—Dah-Wei D Yuan
*Assistant Examiner*—Maria J Laios

(57) ABSTRACT

A fuel cell stack utilizes flow shifting of the anode reactant within the individual fuel cells of the fuel cell stack. The anode side of the fuel cells are separated into two or more flow fields. Anode reactant is supplied in varying quantities to the two flow fields so that anode reactant flowing through one of the flow fields is allowed to back flow into the other flow field and vice versa. The back flowing of anode reactant between the flow fields distributes nitrogen more evenly between the multiple flow fields in each of the fuel cells.

16 Claims, 3 Drawing Sheets

U.S. PATENT DOCUMENTS

| | | |
|---|---|---|
| 6,503,650 B1 | 1/2003 | Yasuo et al. |
| 2004/0157103 A1 | 8/2004 | Takeguchi et al. |
| 2005/0271909 A1 * | 12/2005 | Bai et al. .................... 429/13 |

FOREIGN PATENT DOCUMENTS

| | | |
|---|---|---|
| DE | 1974630 A1 | 4/1998 |
| EP | 1450432 A2 | 8/2004 |

* cited by examiner

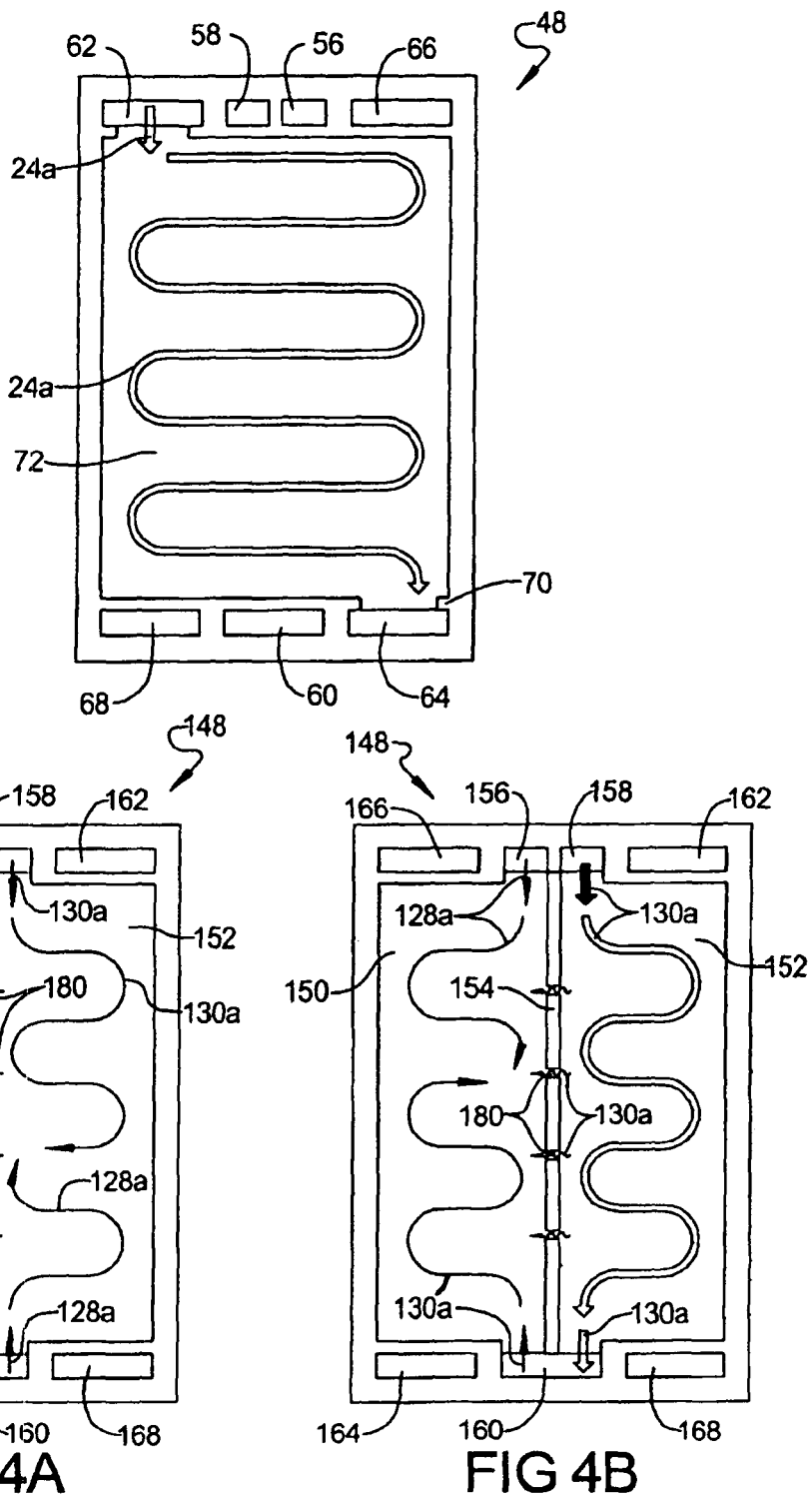

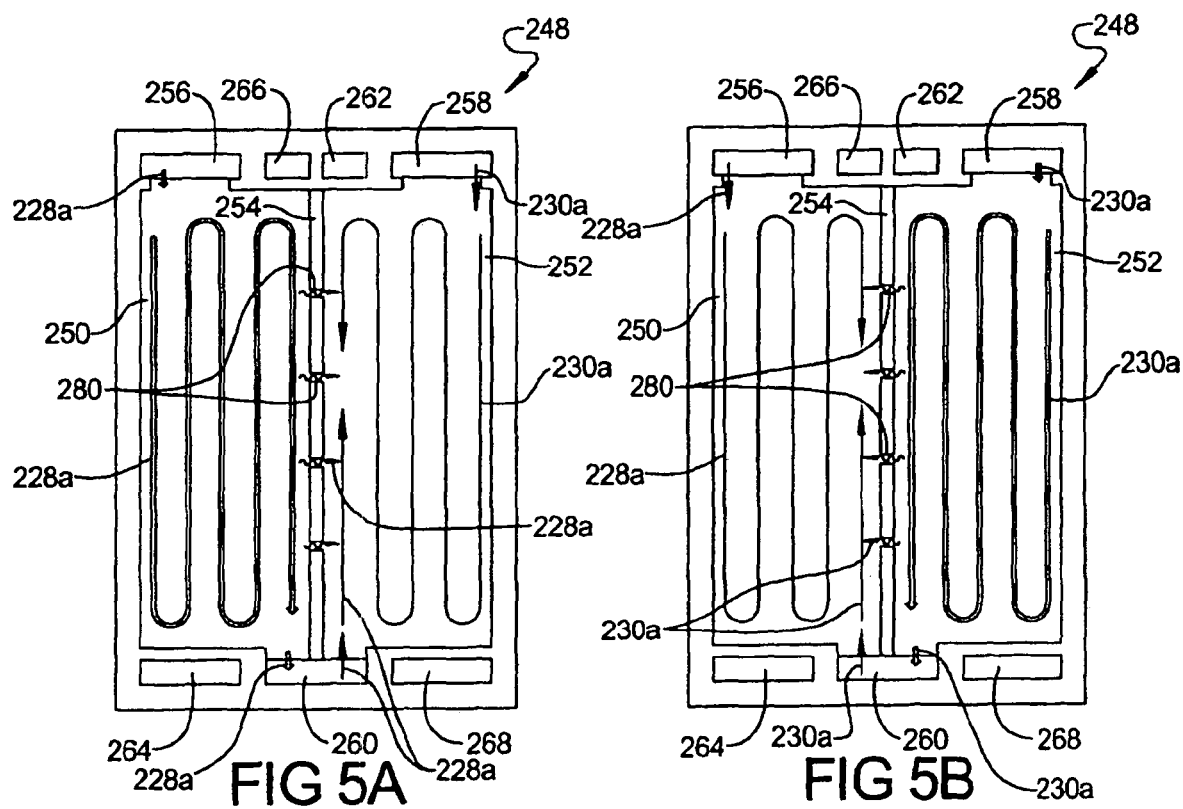

FLOW SHIFTING IN EACH INDIVIDUAL CELL OF A FUEL CELL STACK

FIELD OF THE INVENTION

The present invention relates to fuel cell stacks and, more particularly to flow shifting of reactant in individual fuel cells of the fuel cell stack.

BACKGROUND OF THE INVENTION $H_2$—$O_2$(air) fuel cells are well known in the art and can be used as a power source for many applications. There are several types of $H_2$—$O_2$ fuel cells including acid-type, alkaline-type, molten-carbonate-type, and solid-oxide-type. So called PEM (proton exchange membrane) fuel cells (a.k.a. SPE (solid polymer electrolyte) fuel cells) are of the acid-type, potentially have high power and low weight, and accordingly are desirable for mobile applications (e.g., electric vehicles). PEM fuel cells are well known in the art, and include a "membrane electrode assembly" (a.k.a. MEA) comprising a thin, proton transmissive, solid polymer membrane-electrolyte having an anode on one of its faces and a cathode on the opposite face. The MEA is sandwiched between a pair of electrically conductive elements or plates which (1) serve as current collectors for the anode and cathode, and (2) contain appropriate flow fields and/or openings therein for distributing the fuel cell's gaseous reactants over the surfaces of the respective anode and cathode catalysts. A plurality of individual cells are commonly bundled together to form a PEM fuel cell stack.

In PEM fuel cells hydrogen is the anode reactant (i.e., fuel) and oxygen is the cathode reactant (i.e., oxidant). The oxygen can either be in a pure form (i.e., $O_2$), or air (i.e., $O_2$ mixed with $N_2$). When air is used as the cathode reactant, nitrogen within the cathode flow fields permeates into the anode flow fields across the membrane separating the anode and cathode flow fields. The nitrogen interferes with reaction of the hydrogen by decreasing the hydrogen partial pressure. As the nitrogen concentration increases in the anode flow fields, voltage production of the fuel cell stack will decrease. The decrease in voltage production can be localized to specific fuel cells or can exist throughout all the fuel cells. If the nitrogen concentration gets to high, the fuel cell stack can become fouled by the nitrogen thereby starving the reaction and resulting in unstable voltage production. It is therefore advantageous to prevent nitrogen fouling of the fuel cell stack.

To prevent nitrogen fouling of the fuel cell stack, the nitrogen can be vented from the anode side along with anode effluent, which contains unused hydrogen. The venting of unused hydrogen, however, reduces the efficiency of the fuel cell stack and limits the operating range of the fuel cell stack for a given quantity of hydrogen. Thus, the need for removing nitrogen from the anode side and the desire to avoid venting unused hydrogen must be balanced.

SUMMARY OF THE INVENTION

A fuel cell system according to the principles of the present invention and the methods disclosed herein provide for flow shifting of the anode reactant within individual cells of the fuel cell stack. The anode side of the fuel cells are separated into two or more flow fields. Anode reactant supplied to one of the flow fields is allowed to flow to the other flow field(s) of that fuel cell thereby distributing the permeated nitrogen more evenly between the multiple flow fields in each of the fuel cells.

A fuel cell stack according to the principles of the present invention includes at least two supply headers that are operable to supply two fluid flows of a same fluid and an exhaust header. There are a plurality of plates arranged adjacent one another in a stacked configuration. At least two flow fields are disposed adjacent one another on a first side of the plates. A first one of the flow fields communicates with a first one of the supply headers and receives a first one of the fluid flows from the first supply header. A second one of the flow fields communicates with a second one of the supply headers and receives a second one of the fluid flows from the second supply header. The exhaust header communicates with both of the first and second flow fields and allows fluid flowing through one of the flow fields to flow into a different one of the flow fields via the exhaust header.

A method of operating a fuel cell stack having a plurality of plates each having two flow fields on the same side of the plate is disclosed. The method includes: (1) selectively supplying a first fluid stream to first ones of the flow fields on the plates; (2) selectively supplying a second fluid stream to second ones of the flow fields on the plates, the second fluid stream containing substantially a same fluid as the first fluid stream; (3) selectively causing a portion of the first fluid stream flowing through the first ones of the flow fields to flow into the second ones of the flow field; (4) selectively causing a portion of the second fluid stream flowing through the second ones of the flow fields to flow into the first ones of the flow fields; and (5) producing a voltage output with the fuel cell stack.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a schematic representation of the back side of the plate of FIGS. 2A and B, having a cathode reactant flow field thereon;

FIGS. 4A and B are schematic representations of a first alternate embodiment of a plate used in the fuel cell stack of FIG. 1 having two anode reactant flow fields thereon; and FIGS. 5A and B are schematic representations of a second alternate embodiment of a plate used in the fuel cell stack of FIG. 1 having two anode reactant flow fields thereon.

DETAILED DESCRIPTION OF THE PREFERRED EMBODIMENTS

The following description of the preferred embodiments is merely exemplary in nature and is in no way intended to limit the invention, its application, or uses.

As used herein, the term module refers to an application specific integrated circuit (ASIC), an electronic circuit, a processor (shared, dedicated or group) and memory that execute one or more software or firmware programs, a combinational logic circuit, or other suitable components that provide the described functionality.

Figure 1:
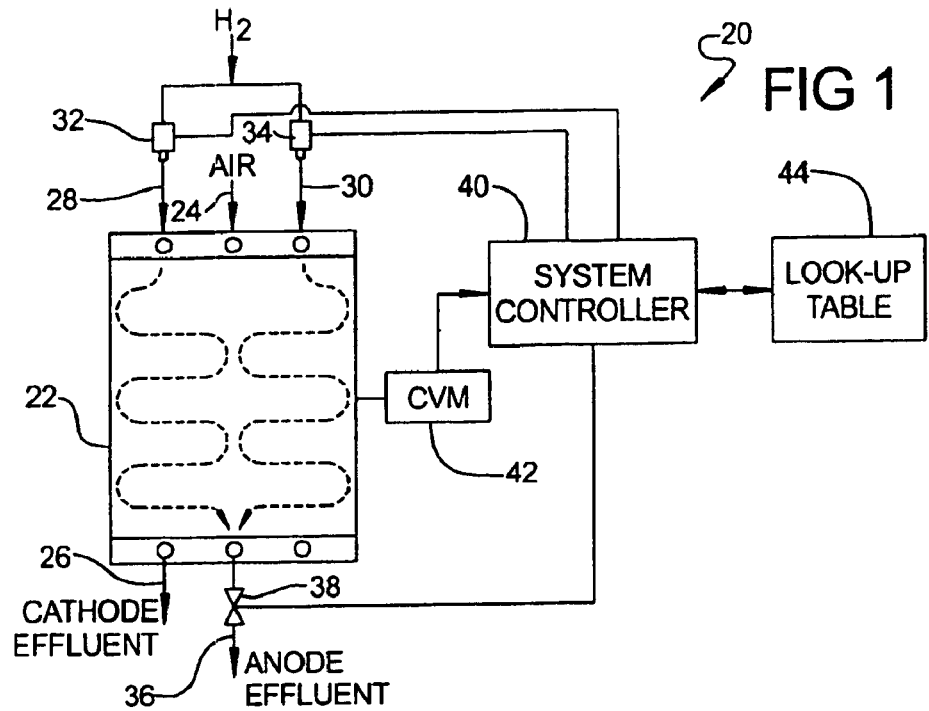
FIG. 1 is a schematic representation of a fuel cell system according to the principles of the present invention.

Referring to FIG. 1, a schematic representation of a preferred embodiment of a fuel cell system 20 according to the principles of the present invention is illustrated. Fuel cell system 20 includes a fuel cell stack 22 comprising a plurality of fuel cells arranged relative to one another in a stacked configuration. Fuel cell stack 22 has a cathode side and two anode sides, as discussed in more detail below. Fuel cell stack 22 is operable to convert anode and cathode reactants into electricity, a hydrogen-containing anode effluent and an oxygen-containing cathode effluent.

The oxygen-containing cathode reactant can be provided from a variety of sources. Such sources include, but are not limited to, air supplied from a storage device or drawn from the environment within which fuel cell system 20 is employed. Regardless of the source of the cathode reactant, a cathode reactant stream 24 is supplied to the cathode side of fuel cell stack 22. A cathode effluent stream 26 is exhausted from fuel cell stack 22. The supplying of cathode reactant to fuel cell stack 22 and the venting of cathode effluent produced in fuel cell stack 22 will not be discussed in detail. It should be understood that cathode reactant will be supplied to fuel cell stack 22 in a quantity sufficient to meet the operational demands of fuel cell system 20 and that cathode effluent will be removed from fuel cell stack 22 as needed.

The hydrogen-containing anode reactant can be provided from a variety of sources. Such sources include, but are not limited to, a reformate stream from a reformer and hydrogen from a hydrogen storage device. Regardless of the source, first and second anode reactant streams 28, 30 are supplied to the two anode sides of fuel cell stack 22 by a pair of metering devices, such as first and second injectors 32, 34. Anode effluent is removed from the two anode sides of fuel cell stack 22 in a single anode effluent stream 36. A bleed valve 38 selectively allows anode effluent stream 36 to exit fuel cell stack 22. Injectors 32, 34 and bleed valve 38 are controlled by a system controller 40. A cell voltage monitor (CVM) 42 communicates with fuel cell stack 22 and controller 40. CVM 42 is operable to monitor the electrical potential or voltage production of the individual fuel cells, groups of fuel cells and/or that of fuel cell stack 22. Specifically, each bipolar plate within fuel cell stack 22 is electrically coupled to a cell voltage unit (not shown) that monitors the voltage of each cell and the overall output power of fuel cell stack 22. Each cell voltage unit includes a plurality of processing modules (not shown) and electrical connectors (not shown) for electrically connecting the bipolar plates in fuel cell stack 22 and provides signals indicative of these voltages as an output to controller 40.

System controller 40 includes one or more modules, as needed, to control the operation of fuel cell stack 22 and of fuel cell system 20. System controller 40 can be a single integrated control that controls the entire operation of fuel cell system 20, or can be comprised of a plurality of discreet controllers that each perform or control different aspects of fuel cell system 20. Controller 40 monitors the operation of fuel cell stack 22 and coordinates the supplying of anode reactant streams 28, 30 and the venting of anode effluent stream 36 to provide flow shifting of anode reactant between the two anode reactant flow fields on each of the fuel cell plates within fuel cell stack 22. For example, controller 40 monitors the power demand placed on fuel cell system 20, the voltage production of the individual fuel cells, groups of fuel cells and/or that of fuel cell stack 22 via CVM 42. Additionally, controller 40 may also monitor the various pressures, temperatures and other operating conditions of fuel cell stack 22 and of fuel cell system 20 as needed. Controller 40 can utilize a lookup table 44 or algorithms in conjunction with one or more monitored operating conditions of fuel cell stack 22 and/or fuel cell system 20 to control and coordinate the operation of injectors 32, 34 and bleed valve 38, as described in more detail below.

Figure 2A:
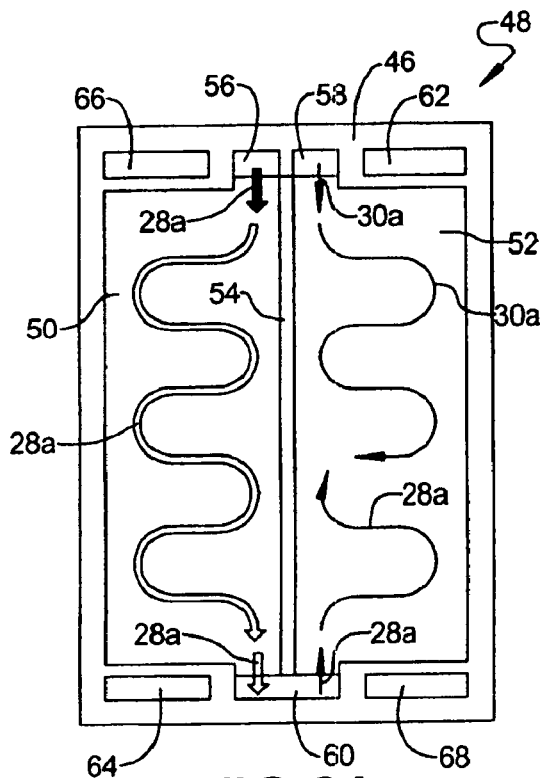
FIGS. 2A and B are schematic representations of a preferred embodiment of a plate used in the fuel cell stack of FIG. 1 having two anode flow fields thereon.

Referring now to FIGS. 2A and B, a first side 46 of plates 48 used in the fuel cells of fuel cell stack 22 according to the preferred embodiment of the present invention is shown. Plate 48 can be a bipolar plate with anode flow fields on first side 46 and a cathode flow field on a second side, as shown in FIG. 3, or an end plate without a cathode flow field on the second side. Furthermore, plate 48 can have internal passageways between the first and second sides through which a coolant flows to remove heat from fuel cell stack 22. First side 46 of plate 48 is the anode side and has first and second anode reactant flow fields 50, 52 thereon. Flow fields 50, 52 are formed by a plurality of channels between lands and provide a tortuous path for the anode reactant flowing therethrough. A divider 54 separates first and second anode reactant flow fields 50, 52 to prevent anode reactant flowing in one of the flow fields from passing directly into the other flow field. First and second anode reactant headers 56, 58 are positioned along one edge of plate 48 while an anode effluent exhaust header 60 is positioned along an opposite edge of plate 48. First and second supply headers 56, 58 communicate with first and second anode reactant flow fields 50, 52 and receive first and second anode reactant streams 28, 30, respectively. Anode effluent exhaust header 60 communicates with bleed valve 38 to allow anode effluent stream 36 to be exhausted from fuel cell stack 22. Plate 48 also has a cathode supply header 62 and a cathode effluent exhaust header 64. Supply header 62 and exhaust header 64, however, do not communicate with flow fields 50, 52 on first side 46 of plate 48. A coolant supply header 66 and coolant exhaust header 68 are also located on plate 48 to allow coolant to be routed to the appropriate flow fields within the fuel cells of fuel cell stack 22. Coolant supply and exhaust headers 66, 68, however, do not communicate with flow fields 50, 52. The supply and exhausting of coolant will not be described in detail. It should be appreciated, however, that coolant will be supplied to and removed from fuel cell stack 22 to remove heat generated therein as required.

Referring now to FIG. 3, a second side 70 of plate 48 is shown. Second side 70 has a cathode reactant flow field 72 thereon through which a portion of cathode reactant stream 24 flows. Flow field 72 is formed by a plurality of channels between lands and provides a tortuous path for the cathode reactant flowing therethrough. Flow field 72 communicates with cathode reactant supply header 62 and cathode effluent exhaust header 64.

Fuel cell system 20 is operated to cause anode reactant to flow or shift between first and second anode reactant flow fields 50, 52 on each plate 48 during the production of electricity. Specifically, system controller 40 operates first and second injectors 32, 34 to vary the quantity of anode reactant flowing into first and second flow fields 50, 52 to cause anode reactant flowing through one of the flow fields to backflow into the other flow field and vice versa. For example, injectors 32, 34 can be operated to cause first anode reactant stream 28 to flow into fuel cell stack 22 in a quantity greater than that of second anode reactant stream 30. As a result, as illustrated in FIG. 2A, the quantity of anode reactant within portion 28a of anode reactant stream 28 flowing into first anode reactant flow fields 50 of each plate 48 is greater than the quantity of anode reactant within portion 30a of second anode reactant stream 30 flowing into second anode reactant flow fields 52 of each plate 48. The difference in the quantity of anode reactant in portions 28a, 30a results in a pressure differential between first and second flow fields 50, 52 and allows some of portion 28*a* to flow into second flow fields 52 through anode effluent exhaust header 60 and meet portion 30*a* at some location within second flow fields 52.

Figure 2B:
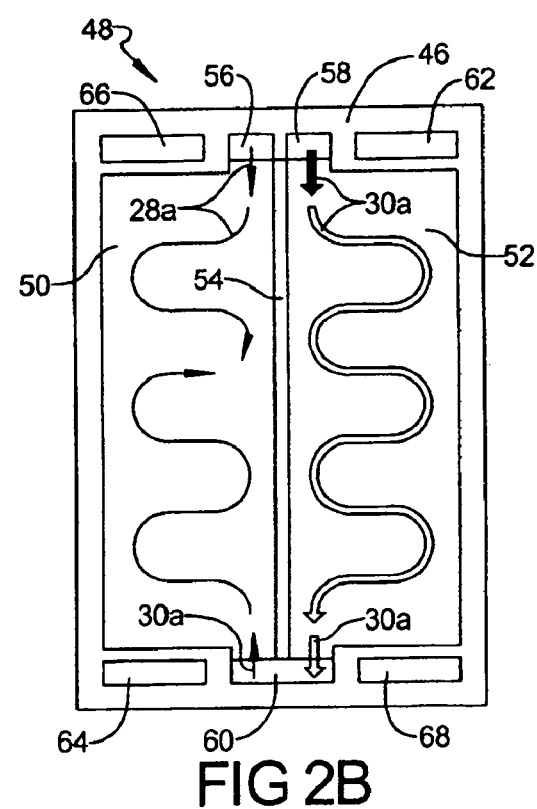

To switch or shift the anode reactant flow to the other direction, system controller 40 causes injectors 32, 34 to provide second anode reactant stream 30 in a greater quantity than first anode reactant stream 28. As a result, as shown in FIG. 2B, the quantity of anode reactant flowing into second flow fields 52 of each plate 48 via portion 30*a* is greater than the quantity of anode reactant flowing into first flow fields 50 in each plate 48 via portion 28*a*. The pressure differential between first and second flow fields 50, 52 allows some of the anode reactant within portion 30*a* to flow into second flow fields 52 through anode effluent exhaust header 60 and meet up with portion 28*a* at some location within first flow fields 50. The location at which portions 28*a*, 30*a* meet depends upon the rate at which the anode reactants are supplied to first and second flow fields 50, 52. Thus, by adjusting the flow rates of first and second reactant streams 28, 30, portions 28*a*, 30*a* of anode reactant streams 28, 30 can meet in either first anode reactant flow fields 50 or second reactant flow fields 52 and can be shifted back and forth therebetween. By shifting these flows between first and second flow fields 50, 52 and the point where the two flows meet nitrogen that has permeated through the membrane into the anode flow fields can be more evenly distributed throughout both first and second anode reactant flow fields 50, 52. This occurs in each plate 48. As a result, the nitrogen is more evenly distributed and a more stable and longer duration of voltage production can be achieved for each fuel cell before necessitating the venting of anode effluent and the nitrogen therein from fuel cell stack 22.

The shifting of the anode reactant flow between first and second flow fields 50, 52 can be controlled via a number of different strategies. A first control strategy is based upon the power output of fuel cell stack 22 and/or a power demand placed on fuel cell stack 22. System controller 40 monitors the power output of fuel cell stack 22 and the power demand placed on fuel cell stack 22 and adjusts the shifting of anode reactant flow between first and second flow fields 50, 52 based on this power output/power demand. System controller 40 can access lookup table 44 and, based upon the power output of fuel cell stack 22 and/or the power demand placed on fuel cell stack 22, the appropriate frequencies for switching the anode reactant flow and the magnitudes of the two anode reactant flows is ascertained. System controller 40 then implements the determined frequency and magnitude of flow shifting. Alternatively, system controller 40 can utilize an algorithm in conjunction with the power output of fuel cell stack 22 and/or the power demand placed on fuel cell stack 22 to ascertain the appropriate frequency and magnitude of flow shifting between first and second flow fields 50, 52. System controller 40 then implements this frequency and magnitude of flow shifting as determined by the algorithm. The data in look-up table 44 and the algorithm can be based upon empirical data from bench testing a representative fuel cell stack.

In a second control strategy, the voltage stability of the fuel cells and/or fuel cell stack 22 is utilized to determine the appropriate frequency and magnitude of flow shifting. System controller 40 monitors the voltage stability of the individual fuel cells and/or of fuel cell stack 22 via CVM 42. Based on this voltage stability, system controller 40 adjusts the frequency and/or magnitude of the flow shifting of anode reactant between first and second flow fields 50, 52. System controller 40 can use look-up table 44 or an algorithm in conjunction with the voltage stability to determine the appropriate frequency and magnitude of flow shifting.

Regardless of the control strategy utilized, it is expected that during periods of low power production and/or power demand, the frequency of shifting the anode reactant flows and/or the magnitude will be lower than during periods of high power output or power demand. Thus, the alternating between having a greater anode reactant flow through first and second flow fields 50, 52 is expected to vary with the power output and/or power demand.

In conjunction with the shifting of the anode reactant between first and second flow fields 50, 52, system controller 40 also controls the venting of anode effluent stream 36 from fuel cell stack 22. System controller 40 can operate fuel cell system 20 such that a continuous stream of anode effluent is being vented from fuel cell stack 22 during operation or, can be operated so that anode effluent is vented from fuel cell stack 22 in a discontinuous manner while operating. When fuel cell system 20 is being operated with a continuous quantity of anode effluent being vented from fuel cell stack 22, the quantity of anode effluent being vented will vary. Normally, the quantity of anode effluent being vented is a small continuous stream that is increased as necessitated by the operational performance of fuel cell stack 22. That is, as the nitrogen builds up within the anode reactant flow fields in fuel cell stack 22, system controller 40 will operate bleed valve 38 to increase the quantity of anode effluent being vented therefrom so that nitrogen, along with the anode effluent, can be purged or removed from the anode sides of fuel cell stack 22. Additionally, the quantity of anode effluent being vented from fuel cell stack 22 will also be varied based upon the amount of water within the anode reactant flow fields so that adequate voltage production can be achieved by the fuel cells within fuel cell stack 22. When a discontinuous venting of anode effluent strategy is utilized, system controller 40 will operate bleed valve 38 to vent anode effluent from fuel cell stack 22 as needed. For example, system controller 40 can monitor the voltage production or stability of the fuel cells in fuel cell stack 22 and vent anode effluent from fuel cell stack 22 as necessitated by the voltage stability.

Thus, system controller 40 operates fuel cell system 20 to shift the anode reactant flows between first and second anode reactant flow fields 50, 52 on each plate 48 and to exhaust anode effluent from fuel cell stack 22 as necessitated. With this control strategy, nitrogen that permeates through the membrane into the anode side of fuel cell stack 22 can be more evenly distributed throughout the anode reactant flow fields within fuel cell stack 22, thus allowing improved performance of fuel cell stack 22. Additionally, the shifting of the anode reactant flows also better distributes the water produced therein and results in better humidification of the anode sides of fuel cell stack 22.

Referring now to FIGS. 4A and B, a first alternate embodiment of a plate 148 is shown. In this embodiment, divider 154 allows some anode reactant to flow directly between first and second flow fields 150, 152 without first flowing through anode effluent exhaust header 160. To accomplish this, divider 154 can be made from a porous or permeable material that allows anode reactant to diffuse therethrough or, as shown, can have a plurality of openings 180 that allow anode reactant to directly flow between first and second flow fields 150, 152 based upon a pressure differential therebetween. Thus, in the first alternate embodiment flow shifting occurs both directly between first and second flow fields 150, 152 and through anode effluent exhaust header 160. When utilizing plates 248 within a fuel cell stack, the same control systems and strategies as discussed above with reference to the preferred embodiment can be employed to cause the anode reactant to shift between first and second flow fields 250, 252.

Referring now to FIGS. 5A and B, a second alternate embodiment of a fuel cell plate 248 is shown. In this embodiment, first and second anode reactant headers 256, 258 are spaced apart in opposing corners of plate 248 along a common edge. Additionally, divider 254 again allows some anode reactant to flow directly between first and second flow fields 250, 252 either via openings 280, as shown, or via a permeable or porous structure (not shown). The positioning of first and second anode reactant headers 256, 258 at opposing corners results in the flow of anode reactant directly between first and second flow fields 250, 252 being delayed until the anode reactant flowing through one of the flow fields is adjacent divider 254. In other words, the anode reactant must flow through more of the flow field prior to encountering divider 254 and flowing directly to the other flow field. The configuration of the channels through which anode reactant flows in each of flow fields 250, 252 also affects when the anode reactant encounters divider 254. When utilizing plates 248 within a fuel cell stack, the same control systems and strategies as discussed above with reference to the preferred embodiment can be employed to cause the anode reactant to shift between first and second flow fields 250, 252.

While the present invention has been described by reference to specific examples shown, it should be appreciated that variations in the present invention can be employed without departing from the spirit and scope of the present invention. For example, other supply devices can be utilized in lieu of injectors 32, 34. Additionally, while plate 48 is shown as having two anode reactant flow fields 50, 52, more than two distinct anode reactant flow fields can be utilized on plate 48 and flow shifting occurring between the various flow fields. Furthermore, while plate 48 is shown as having a single cathode reactant flow field on the second side thereof, it should be appreciated that the cathode side can also be divided into two or more discrete cathode reactant flow fields and flow shifting of the cathode effluent therebetween also implemented, although all of the benefits may not be realized. Moreover, it should be appreciated that the exhaust header that communicates with the two flow fields can be divided into two discreet header sections that communicate with one another near the outlet of the fuel cell stack. The divided exhaust header allows each fluid flow path to communicate with one another. A fluid flowing through one of the flow paths can flow through its associated exhaust header through the other exhaust header and back into the other flow field and vice versa. This configuration increases the flow velocity of the fluid flows through the flow paths and exhaust header sections thereby improving the nitrogen and water removal from the flow fields and from the fuel cell stack. Thus, the description of the invention is merely exemplary in nature and variations that do not depart from the gist of the invention are intended to be within the scope of the invention. Such inventions are not to be regarded as a departure from the spirit and scope of the invention.

What is claimed is:

1. A plate for a fuel cell, the plate comprising:
   at least two fluid inlets each connected to a separate one of at least two metering devices;
   a fluid outlet; and
   at least two flow fields substantially co-planar with one another, a first one of said flow fields communicating with a first one of said inlets and receiving a first fluid flow through said first inlet and a second one of said flow fields communicating with a second one of said inlets and receiving a second fluid flow through said second inlet, wherein said plate has opposite exterior surfaces, said at least two substantially co-planar flow fields are anode reactant flow fields and are located on a first of said exterior surfaces and a single cathode reactant flow field is disposed on a second of said exterior surfaces,
   wherein said outlet communicates with both of said first and second flow fields; and
   a controller configured to control said at least two metering devices to control flow through said at least two flow fields such that fluid flowing through one of said flow fields backflows into a different one of said flow fields via said outlet.

2. The plate of claim 1, further comprising a divider separating said first flow field from said second flow field.

3. The plate of claim 2, wherein said divider prevents a fluid flowing through one of said first and second flow fields from flowing into the other one of said first and second flow fields without first passing through said outlet.

4. The plate of claim 2, wherein said divider allows a portion of a fluid flowing through one of said first and second flow fields to flow into the other one of said first and second flow fields without passing through said outlet.

5. The plate of claim 1, wherein said inlets are adjacent one another.

6. The plate of claim 1, wherein said inlets are disposed adjacent opposing corners of said plate and adjacent a common edge of said plate.

7. The plate of claim 1, wherein each of said flow fields is a multiple pass flow field with said first and second fluid flows flowing across said respective first and second flow fields multiple times prior to flowing into said fluid outlet.

8. The plate of claim 1, wherein each of said flow fields is an anode reactant flow field.

9. A fuel cell stack comprising:
   at least two supply headers operable to supply two fluid flows of a same fluid, each of said at least two supply headers being connected to a separate one of at least two metering devices;
   an exhaust header;
   a plurality of plates arranged adjacent one another in a stacked configuration; and
   at least two flow fields disposed adjacent one another on a first side of said plates;
   a single flow field on a second side of each of said plates;
   wherein a first one of said flow fields communicates with a first one of said supply headers and receives a first one of said fluid flows from said first supply header, a second one of said flow fields communicates with a second one of said supply headers and receives a second one of said fluid flows from said second supply header, and said exhaust header communicates with both of said first and second flow fields; and
   a controller configured to control said at least two metering devices to control flow through said at least two flow fields such that fluid flowing through one of said flow fields backflows into a different one of said flow fields via said exhaust header.

10. The fuel cell stack of claim 9, further comprising a divider on said first sides of said plates, said divider separating said first flow field from said second flow field.

11. The fuel cell stack of claim 10, wherein said divider prevents a fluid flowing through one of said first and second flow fields from flowing into the other one of said first and second flow fields without first passing through said exhaust header.

12. The fuel cell stack of claim 10, wherein said divider allows a portion of a fluid flowing through one of said first and second flow fields to flow into the other one of said first and second flow fields without passing through said exhaust header.

13. The fuel cell stack of claim 9, wherein said first and second headers are adjacent one another.

14. The fuel cell stack of claim 9, wherein said first second headers are disposed adjacent opposing corners of said plates and adjacent a common edge of said plates.

15. The fuel cell stack of claim 9, wherein said supply headers are anode reactant supply headers, said same fluid is anode reactant, said first and second flow fields are anode reactant flow fields, and said exhaust header is an anode effluent exhaust header.

16. The fuel cell stack of claim 9, wherein at least one of said plates is a bipolar plate.

* * * * *